Feb. 17, 1931.  A. T. YATES  1,792,522
SHEARING MACHINE
Filed Oct. 17, 1929
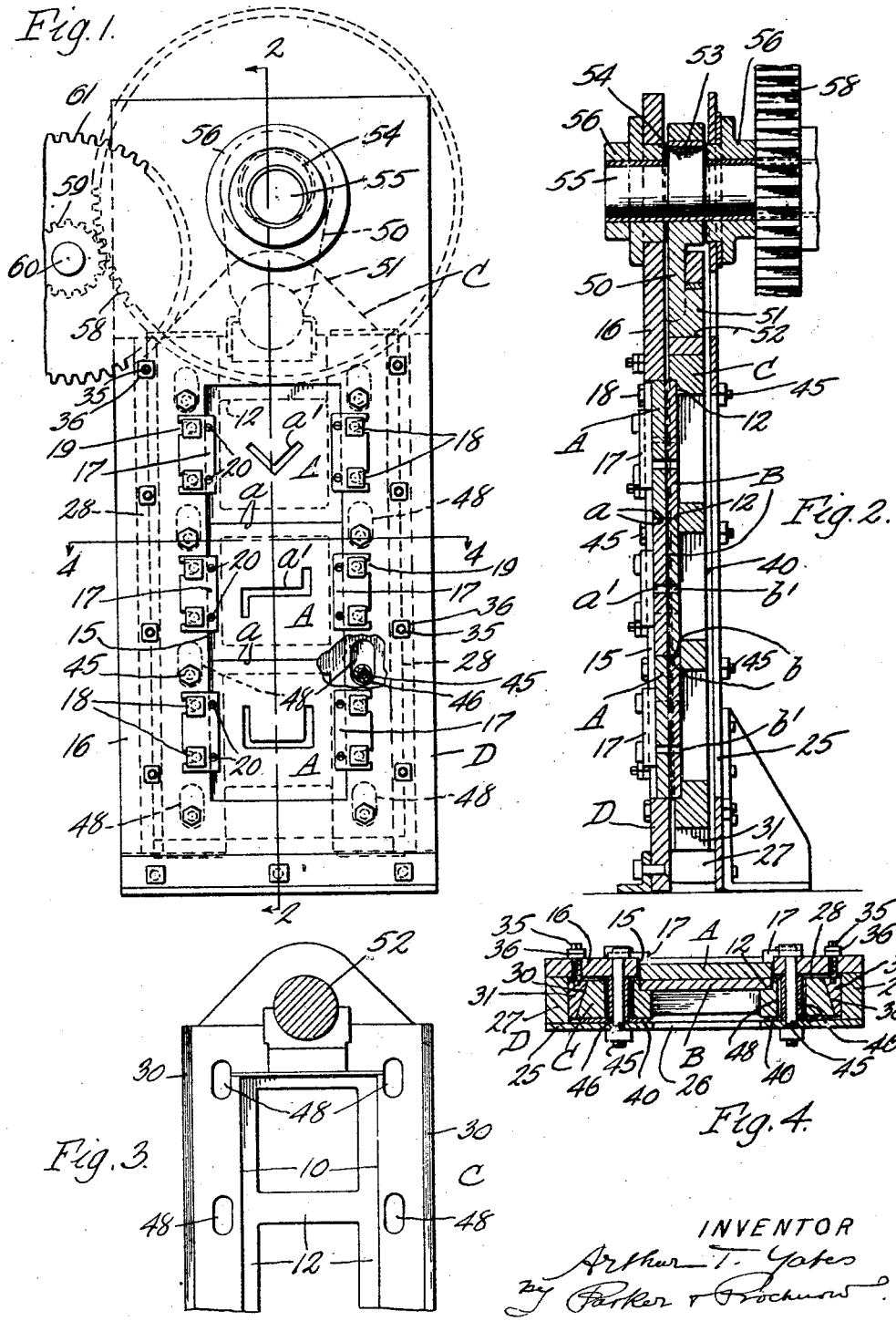
INVENTOR
Arthur T. Yates
by Parker & Brockman
ATTORNEYS Patented Feb. 17, 1931

1,792,522

UNITED STATES PATENT OFFICE

ARTHUR T. YATES, OF BUFFALO, NEW YORK, ASSIGNOR TO BUFFALO FORGE COMPANY, OF BUFFALO, NEW YORK

SHEARING MACHINE

Application filed October 17, 1929. Serial No. 400,261.

This invention relates to improvements in shearing machines, such as are used for cutting metal bars and structural shapes of different cross section.

These machines usually comprise a movable cutting member or plunger having one or more cutting or shearing plates or members mounted thereon and arranged in face to face contact with a corresponding number of stationary cutting plates or members. The stationary and movable cutting plates are provided with apertures corresponding in size and shape to the cross section of the bar or section to be cut. The cutting is effected by bringing said apertures into registration so that the bar can be passed therethrough, and then reciprocating the plunger. The cutting member or plunger is confined in a frame or support provided with parts which overhang the opposite faces of the plunger adjacent its longitudinal or side edges so as to form a guide for the plunger and with extensions which overlap the stationary plates to maintain them in position against the cutting plate or plates of the plunger.

As ordinarily constructed the parts of the frame which overhang the plunger are connected and held in spaced relation by bolts or securing devices disposed outwardly or beyond the longitudinal edges of the plunger, and these securing means are, therefore, at a considerable distance from the longitudinal axis of the plunger and from the cutting edges of the cutting plates or members.

This construction, however, is objectionable especially when cutting relatively heavy bars or shapes, since the cutting plates and the adjacent confining portions of the machine are unsupported near the cutting area or cutting edges of the cutting plates, resulting in spreading or separation of said plates at the point where the cutting is effected. Consequently, an irregular or imperfect cut is made and the cutting edges soon become dull, necessitating replacement of the cutting plates.

The objects of the present invention are to provide an improved shearing machine of the character stated which is constructed so as to overcome the aforementioned objections; also to construct a shearing machine in which portions of the frame which overhang and guide the plunger are supported inwardly of the side edges of the plunger so as to connect these parts relatively close to the longitudinal axis of the said plunger; also to provide a shearing machine having a plunger which is constructed to permit such connecting means to be so positioned; also to provide a shearing machine constructed as hereinbefore stated in which the stationary and movable cutting plates can be readily inserted and removed; and also to improve shearing machines of this character in the other respects hereinafter set forth and claimed.

In the drawings:

Fig. 1 is a front elevation, partly in section, of an embodiment of my improved shearing machine.

Fig. 2 is a vertical cross section thereof on line 2—2, Fig. 1.

Fig. 3 is a face view of a portion of the plunger thereof, removed from the machine.

Fig. 4 is a horizontal section of the machine on line 4—4, Fig. 1.

In the illustrated embodiment of the invention, the shearing machine includes a plurality of relatively stationary cutting plates or members A arranged on edge one above the other with their adjacent horizontal edges $a$ in contact. In rear of and in contact with said cutting plates A is a cutting member C having a corresponding series of cutting plates B arranged with their adjacent horizontal edges $b$ in contact. The plates A and B are each provided with one or more complementary apertures or openings, $a^1$ and $b^1$ respectively which when brought into registration, permits a bar or structural shape of a size and cross section corresponding to the apertures, to be passed therethrough in the usual manner.

The cutting plates B are mounted in or arranged with their side edges engaging the edges of an opening 10 in the cutting member or plunger C with their rear faces bearing against shoulders 12 formed by inward marginal flanges extending around said opening 10.

The edges of the apertures $a^1$ and $b^1$ engage and cut the bar or shape when vertical endwise movement is imparted to the plunger C, whereby the openings in the plates B are shifted relatively to the corresponding openings in the plates A.

The plates A are likewise mounted in a rectangular recess or seat 15 formed in the front wall or plate 16 of a stationary frame or support D, being confined in said seats by overhanging projections or parts 17 on said plate 16 which extend inwardly over the side edges of the recess 15 and engaging the front faces of said plates adjacent their opposite side edges. Preferably the projections or extensions 17 are formed separately from and are adjustably secured on the front face of the frame plate 16, as by means of bolts 18 which pass through lateral slots 19 in said plates with their heads bearing against the latter. The overhanging portions of the projections 17 are detachably secured to the adjacent stationary plates A by screws or fastening devices 20, so that by removing the bolts 18 of one plate the same may be removed, and the remaining plates will be supported by their bolts 18 and prevented from dropping out of place.

As shown in Fig. 4 the frame D is completed by a back plate 25 which extends inwardly over the back face of the plunger C and is preferably formed with a central opening 26. The outer side edge portions of the front plate 16 and of the back plate 25 are connected by upright vertical filler members or plates 27 disposed outwardly beyond the edges of the plunger C, thus forming with said plates a U-shaped guideway 28 at each side of the latter for confining and guiding the same in its movements.

The opposite side edges 30 of the plunger C are beveled or inclined so as to have a tapered or dovetailed engagement with a pair of correspondingly tapered guide strips 31, one of which is disposed in the bottom of the guideway 28 at each side of the plunger C so as to operatively engage the edges 30 of the latter.

In order to compensate for wear between the contacting edges 30 of the plunger C and guide strips 31, the latter are made adjustable as by means of adjusting screws or devices 35 which operatively engage in threaded holes in the front plate 16 with their inner ends bearing against the strips 31. Suitable nuts 36 are provided for holding the bolts or screws 35 in adjusted position.

If desired, suitable wear plates 40 may be interposed between the back plate 25 and the adjacent back face of the plunger 11, the front face of the plunger being held out of engagement with the adjacent front plate 16 by guide strips 31.

In order to effect the proper spacing between the front and back plates 16 and 25 and prevent relative spreading or separation thereof for the purpose of maintaining the cutting plates A and B in face to face contact, means are provided in accordance with this invention for connecting said plates 16 and 25 adjacent the side edges of the cutting plates A and B and within the outer edges 30 of the plunger C.

These means, in the construction shown, comprise a plurality of transverse bolts or securing devices 45 disposed in vertical rows in spaced relation. Each of these bolts extends through holes in said front and back plates and supports a spacing sleeve 46 which is disposed between and bears against the inner faces of said plates, near the side edges of the cutting plates A and B, so that when said bolts are tightened up said sleeves 46 will maintain said plates in the desired spaced relation.

As thus shown the bolts are disposed within the side edges of the plunger C, and in order to permit the necessary movement or stroke of said plunger, the latter is formed with vertical slots or apertures 48 through which said sleeves and bolts extend, said slots being of such length as will permit the necessary reciprocatory motion of the plunger without interference by engagement with said bolts and sleeves.

By the construction described, the securing and spacing means for effecting the proper separation and relative disposition of the front and back plates of the machine relatively to the plunger C are located only a relatively short distance from the vertical axis of the latter and are, therefore, disposed close to the cutting area of the cutting plates A and B. In this manner a maximum of resistance to spreading between said plates A and B is offered, thus prolonging the life of the latter, and enabling more efficient work to be produced.

Any suitable means may be provided for actuating the plunger C, such as a crank 50 having a projection or stud 51 at one end which is received in a correspondingly shaped hole 52 in the upper end of the plunger. The crank 50 has a hole 53 at its opposite end for the reception of an eccentric 54 on a driven shaft 55 which is rotatably mounted in bearings 56 in the upper end of the frame D.

The shaft 55 may be rotated by any suitable driving means, such as a gear 58, meshing with a pinion 59 on a counter shaft 60. This shaft has a gear 61 operatively connected to a drive shaft (not shown).

Claims:

1. In a shearing machine, a stationary cutting member, a movable cutting member in sliding contact therewith, said members having opposite side edges and cutting edges disposed between the same for cutting bars and the like upon movement of said second member relative to said first member, parts overlying and engaging the outer faces of said cutting members adjacent said side edges thereof, and means disposed between the side edges of said second member and said cutting edges of said members which connect said overlying parts and prevent separation between said cutting edges during cutting operations.

2. In a shearing machine, a stationary cutting member, a movable cutting member in sliding contact therewith, said members having opposite side edges and cutting edges disposed between the same for cutting bars and the like upon movement of said second member relative to said first member, parts overlying and engaging the outer faces of said cutting members adjacent said side edges thereof, spacing means extending between and engaging said overlying parts, securing means also extending between the same for holding said parts rigidly against said spacing means, said spacing means and said securing means being disposed between the side edges of said second member and the cutting edges of said members, whereby said parts are connected and separation between said cutting edges prevented during cutting operations.

3. In a shearing machine, a stationary cutting member, a second cutting member disposed in face to face contact therewith and which is movable relatively thereto to cut bars and the like, a guide for said second cutting member embracing adjacent side edges of said members and having parts extending upon the outer faces thereof, and means connecting said guide parts inwardly of the side edges of said second cutting member, whereby said contacting cutting members are prevented from separating during cutting operations.

4. In a shearing machine, a stationary cutting member, a movable cutting member in sliding face to face contact therewith, like apertures in said cutting members which are registerable with each other to permit bars and the like to be passed therethrough and the edges of which act to cut the same when said second cutting member is moved and its aperture shifted out of registration with the aperture in said first member, parts overlying and engaging the outer faces of said cutting members adjacent an edge of said second member, and means disposed inwardly of said edge thereof which connects said overlying parts and prevents separation between the contacting faces of said cutting members.

5. In a shearing machine, a stationary cutting member, a movable cutting member in face to face contact therewith, said cutting members having cutting edges for cutting bars and the like when said second member is moved relatively to the first, a guide for said movable cutting member having parts overlying and engaging the outer faces of said cutting members, spacing means disposed between and engaging said guide parts inwardly of the edge of said movable cutting member to hold said parts in spaced relation, and securing means for holding said parts rigidly against said spacing means and for preventing separation between said cutting members.

6. In a shearing machine, a stationary cutting member, a plunger having a second cutting member mounted thereon and which is disposed in sliding face to face contact with said other member for cutting bars and the like upon movement of said plunger, a guide for said plunger having parts extending inwardly over the opposite sides of said plunger and one of said parts engaging the outer face of said stationary cutting member, securing means for connecting said spaced guide parts, and said plunger having apertures disposed inwardly of said sides thereof through which said connecting means extend to permit said connecting means to be disposed adjacent said cutting members.

7. In a shearing machine, a movable plunger, a cutting member carried thereby, a stationary cutting member, a frame having a guide for said plunger including spaced parts extending over opposite faces thereof and one of which extends upon the outer face of said stationary cutting member, said plunger having an aperture therein, and connecting means extending through said aperture for connecting said spaced parts.

8. In a shearing machine, a movable plunger, a cutting member carried thereby, a stationary cutting member, a frame having a guide for said plunger disposed along a side edge thereof and including spaced parts extending over opposite faces of said plunger, said plunger having an aperture disposed between said side edge thereof and the cutting member carried thereby, and means extending through said aperture for connecting said spaced parts and securing said parts in fixed relation.

9. In a shearing machine, a movable plunger, a cutting member arranged in a seat therein and having a face bearing against a shoulder on said plunger, a stationary cutting member disposed in face to face relation to said other cutting member, a guide for said plunger embracing an edge and extending upon opposite faces thereof, a part on said guide extending upon the outer face of said stationary cutting member for holding the same in contact with said other cutting member and the latter against said shoulder on said plunger, and means disposed between said edge of said plunger and its cutting member for maintaining the relation between said fixed guide part and said plunger shoulder whereby separation between said cutting members is prevented.

10. In a shearing machine, a stationary cutting member having opposite side edges, a movable cutting member in sliding face to face contact therewith and having opposite side edges disposed outwardly beyond the corresponding side edges of said stationary member, a guide for said movable cutting member including spaced parts extending upon the opposite outer faces of said members, and means connecting said spaced parts of said guide which extend between the same and are disposed outwardly beyond said side edges of said stationary member and within the side edges of said movable member.

11. In a shearing machine, a stationary cutting member having opposite side edges, a movable cutting member in sliding face to face contact therewith and having opposite side edges disposed outwardly beyond the corresponding side edges of said stationary member, a guide for said movable cutting member including spaced parts extending upon the opposite outer faces of said members, said movable cutting member having apertures formed therein between its side edges and the corresponding edges of said stationary cutting member, and means extending through said apertures and connecting said spaced parts to maintain said cutting members in contact.

ARTHUR T. YATES.